United States Patent
Lee et al.

(10) Patent No.: US 7,633,947 B2
(45) Date of Patent: Dec. 15, 2009

(54) METHOD AND APPARATUS FOR PERFORMING ACTIVE PACKET BUNDLING IN A VOICE OVER-IP COMMUNICATIONS SYSTEM BASED ON SOURCE LOCATION IN TALK SPURTS

(75) Inventors: Minkyu Lee, Ringoes, NJ (US); James William McGowan, Whitehouse Station, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 728 days.

(21) Appl. No.: 11/288,743

(22) Filed: Nov. 29, 2005

(65) Prior Publication Data
US 2007/0121594 A1    May 31, 2007

(51) Int. Cl.
*H04L 12/56* (2006.01)
(52) U.S. Cl. .................................. 370/395.42
(58) Field of Classification Search .......... 370/229, 370/230, 230.1, 231, 352–356, 395.42, 412; 709/236
See application file for complete search history.

(56) References Cited

U.S. PATENT DOCUMENTS 5,754,536 A * 5/1998 Schmidt .............. 370/330
6,407,994 B1 * 6/2002 Archer .............. 370/351
7,474,627 B2 * 1/2009 Chheda et al. .......... 370/252
2003/0212550 A1 * 11/2003 Ubale .............. 704/215
2004/0213265 A1 * 10/2004 Oueslati et al. ........ 370/395.42

OTHER PUBLICATIONS

Henning, S. et al., "Speech Property-Based FEC for Internet Telephony Applications," proceedings SPIE/ACM/SIGMM Multimedia Computing and Networking Conference 2000, San Jose, CA, Jan. 2000.
U.S. Appl. No. 10/394,118, filed Mar. 21, 2003, M. Lee et al.
U.S. Appl. No. 10/936,990, filed Sep. 9, 2004, M. Lee et al.
U.S. Appl. No. 10/953,907, filed Sep. 29, 2004, M. Lee et al.
U.S. Appl. No. 11/062,966, filed Feb. 22, 2005, M. Lee et al.
U.S. Appl. No. 11/078,012, filed Mar. 11, 2005, M. Lee et al.

* cited by examiner

*Primary Examiner*—Kwang B Yao
*Assistant Examiner*—Alex Skripnikov
(74) *Attorney, Agent, or Firm*—Kenneth M. Brown

(57) ABSTRACT

A method and apparatus for bundling packets together for transmission in a Voice over IP communications network based on packet location within a talk spurt. Illustratively, all frames other than the first and last frames of a talk spurt may be advantageously bundled up to a predetermined maximum bundle size. This results from the recognition that the first and last packets of the talk spurt are the packets that will most directly affect the conversational delay. Therefore, other packets can be advantageously considered to be "non-critical" (with respect to conversational delay), and thus, may be bundled together with one or more other packets. In this manner, bandwidth may be advantageously reduced without negatively impacting the perceived conversational delay.

20 Claims, 1 Drawing Sheet

METHOD AND APPARATUS FOR PERFORMING ACTIVE PACKET BUNDLING IN A VOICE OVER-IP COMMUNICATIONS SYSTEM BASED ON SOURCE LOCATION IN TALK SPURTS

FIELD OF THE INVENTION

The present invention relates generally to the field of packet based communications networks for providing VoIP (Voice over Internet Protocol) communications services, and in particular to a method and apparatus for bundling packets together for transmission based on certain characteristics of the given packets.

BACKGROUND OF THE INVENTION

In Voice-over-IP (VoIP) communications systems, voice signal data is transmitted across a telecommunications network to a receiver as a series of discrete packets. Each packet contains a sample of speech material, each typically comprising one speech "frame," and the speech material of the transmitted packets is then combined, in sequence, with the other transmitted packets, at the network receiver. (Speech signals are typically divided into a contiguous sequence of "frames," where each such speech "frame" is a speech segment represents a predetermined time interval, such as, for example, 20 milliseconds.) Thus, the receiver is able to reconstruct the transmitted speech signal for appropriate playback to a listener.

However, transmission of information over Internet Protocol (IP) networks is more specifically accomplished with a series of stacked protocols responsible for sending and receiving packets. Each protocol handles the communication between one specific component of the network on the sending side and its peer on the receiving side. For example, the Internet Protocol (IP) itself contains information relevant to moving packets between routers. The Hypertext Transmission Protocol (HTTP) contains information relevant to moving hypertext (i.e., specially formatted text) between a web server and a web browser. The hypertext is referred to as the "payload" of HTTP, and the additional information is referred to as a "header" (or, less commonly, a "footer" when it is transmitted after, as opposed to before, the payload). An entire HTTP packet—payload and header combined—is delivered over an IP network as the payload of an IP packet. This stacking of the headers can include many layers depending upon the application and network design.

In an application such as Voice-over-IP (VoIP), for example, a payload of voice data may have User Datagram Protocol (UDP), Real-Time Transport Protocol (RTP), and IP headers added, plus additional headers for the physical layer. (Note that each of the above-identified protocols is fully familiar to those of ordinary skill in the art.) The net effect is that the size of the headers will far exceed the size of the payload. Thus, most of the bandwidth in the network is dedicated to overhead unrelated to the voice data itself.

One technique for decreasing the VoIP overhead is to place multiple voice frames in a single packet. This technique of placing multiple voice frames in a single packet is known as "bundling." Consistently placing two frames in every packet, for example, will clearly reduce the overhead by 50%. Bundling techniques are familiar to those of ordinary skill in the art, and such techniques are commonly employed when a packet scheduler becomes overloaded. (A packet scheduler is an algorithm responsible for the delivery of packets over a network, which may, for example, comprise an air interface.) If the packet scheduler, because of limited bandwidth, cannot service a user within the frame rate, that user will end up having two packets waiting to be transmitted when they are successfully scheduled.

Unfortunately, packet bundling requires buffering, and thus, delaying, one or more frames until another is ready. In a typical VoIP application, this will likely add, for example, 20 milliseconds of delay (i.e., the frame rate of the codec, which, as pointed out above, is commonly 20 milliseconds) for each buffered frame. This added delay often detrimentally affects the natural back and forth nature of a typical voice conversation. (This form of delay is known as "conversational delay.") Therefore, for typical telephony networks, the bandwidth savings does not usually justify the added delay associated with preemptively delaying packets.

In U.S. patent application Ser. No. 11/062,966, "Method And Apparatus For Handling Network Jitter In A Voice-Over IP Communications Network Using A Virtual Jitter Buffer And Time Scale Modification," filed by M. Lee et al. on Feb. 22, 2005, and commonly assigned to the assignee of the present invention, a method for handling network jitter in a communications network using a virtual jitter buffer and time scale modification is provided wherein the time scale of individual voice packets are modified based on the location of a voice packet within a talk spurt. (A talk spurt is a continuous stream of a user's speech between periods of his or her silence.) In accordance with the method provided therein, a "virtual" jitter buffer is thereby effectuated, providing network jitter protection in the "middle" of a talk spurt, while allowing the virtual jitter buffer length to become essentially zero at each talk spurt beginning and end. In this manner, the vast majority of voice packets (i.e., those in the "middle" of the talk spurt) are protected from network jitter, while the fact that there is a zero length jitter buffer at the beginning and end of the talk spurt results in there being no perceived added conversational delay. (Methods such as the one provided by U.S. patent application Ser. No. 11/062,966 will in general be referred to herein as "talk spurt management" techniques.) U.S. patent application Ser. No. 11/062,966 is hereby incorporated by reference as if fully set forth herein.

In addition, in U.S. patent application Ser. No. 11/078,012, "Method And Apparatus For Routing Voice Packets In A Voice-Over IP Communications Network Based On A Relative Packet Location Within A Sequence," filed by M. Lee et al. on Mar. 11, 2005, and commonly assigned to the assignee of the present invention, a method for routing voice packets in a VoIP communications network is provided wherein the routing priority is based, for example, on the location of a packet within a talk spurt. In particular, the method of U.S. patent application Ser. No. 11/078,012, in one embodiment thereof, takes advantage of the recognition that when the above-described method of U.S. patent application Ser. No. 11/062,966 is employed to perform talk spurt management, then it may be advantageous to give packets at the beginning and the end of the talk spurt a higher routing priority than those in the middle of the talk spurt. U.S. patent application Ser. No. 11/078,012 is also hereby incorporated by reference as if fully set forth herein.

SUMMARY OF THE INVENTION

We have recognized that when using a virtual jitter buffer and talk spurt management technique such as is taught by U.S. patent application Ser. No. 11/062,966, certain "non-critical" packets can be advantageously delayed for bundling, thereby advantageously reducing overall bandwidth requirements, without having a detrimental effect on conversational delay. More particularly, in accordance with the principles of the present invention, packets are advantageously bundled based on their location within a talk spurt. For example, in accordance with one illustrative embodiment of the present invention, all frames other than the first and last frames of a talk spurt may be advantageously bundled up to a predetermined maximum bundle size. This results from the recognition that the first and last packets of the talk spurt are the packets that will most directly affect the conversational delay. Therefore, other packets can be advantageously considered to be "non-critical" (with respect to conversational delay), and thus, may be bundled together with one or more other packets. In this manner, bandwidth may be advantageously reduced without negatively impacting the perceived conversational delay.

More specifically, a method and apparatus is provided for bundling packets together for transmission in a Voice over IP communications network comprising steps or means for (i) determining a location of a given voice frame within a talk spurt; (ii) classifying the given voice frame as one of either a critical frame or a non-critical frame based on the determined location of the given voice frame within a talk spurt; (iii) bundling the given voice frame together with at least one subsequent voice frame when the given voice frame has been classified as a non-critical frame; and (iv) transmitting the bundled voice frames together across said communications network as a single packet.

DETAILED DESCRIPTION OF THE ILLUSTRATIVE EMBODIMENTS

Figure 1:
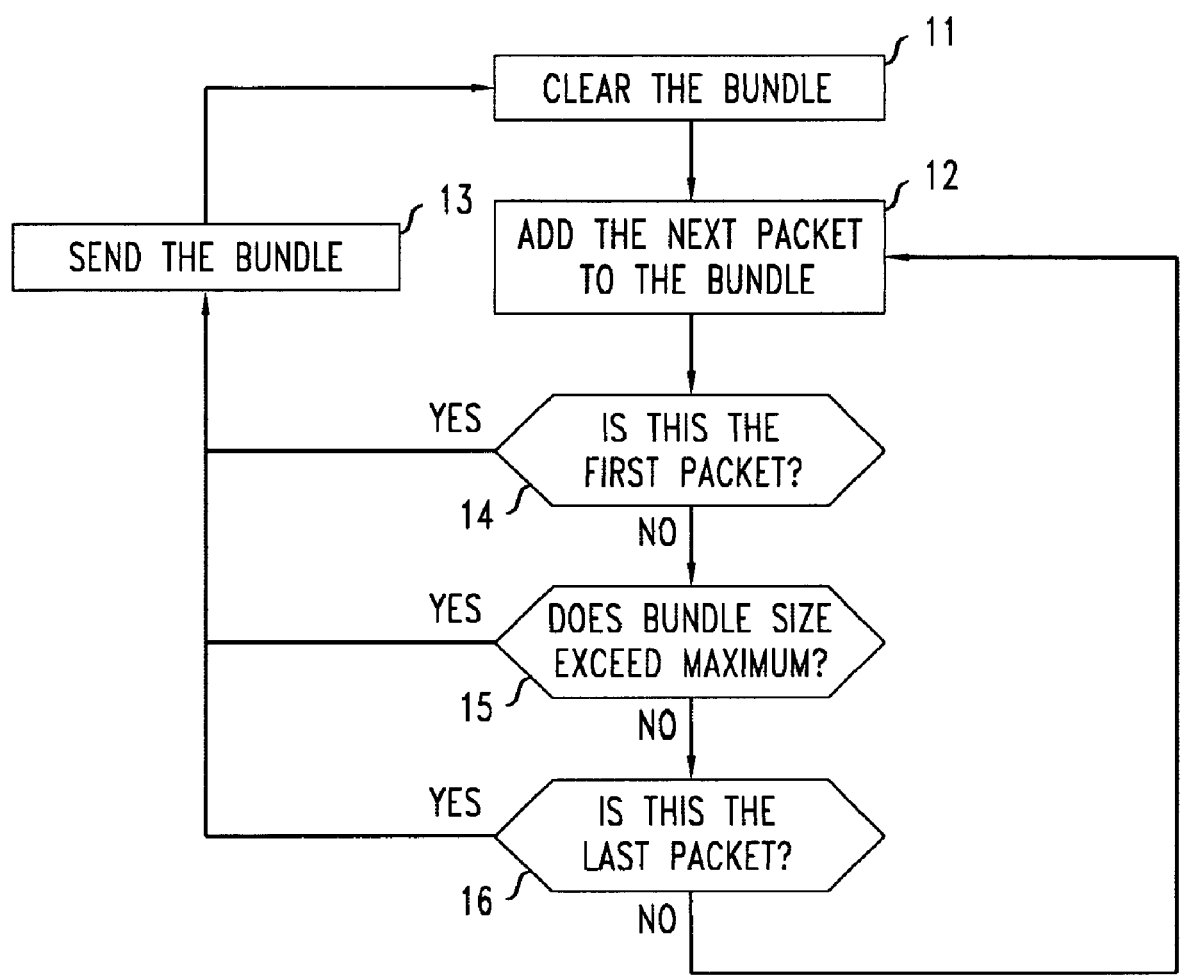
FIG. 1 shows a flowchart of a method for performing packet bundling based on packet location in a talk spurt in accordance with an illustrative embodiment of the present invention.

In accordance with the principles of the present invention, bundling of certain "non-critical" (with respect to effect on conversational delay) packets is performed based on the location of the packet within a given talk spurt. As described in U.S. patent application Ser. No. 11/062,966 and in U.S. patent application Ser. No. 11/078,012 (each of which has been incorporated by reference herein), various techniques may be employed to determine the location of a given voice packet (i.e., frame) within a talk spurt, such as, for example, by examining the coding rate of the various voice frames in the sequence of frames. Thus, it will be assumed herein that the location of a given voice packet within a talk spurt can be easily determined.

In accordance with certain illustrative embodiments of the present invention, it is assumed that a talk spurt management technique such as the one described in U.S. patent application Ser. No. 11/062,966 is employed. Then, if a given packet is the beginning or the ending portion of a talk spurt, it is advantageously delivered without any delay (i.e., it is not bundled) so as to minimize any effect on conversational delay. If, on the other hand, the given packet is in the middle of a talk spurt, where enough jitter protection is already provided by the virtual jitter buffer, then the packet can be bundled with the next one or more packets for more efficient bandwidth use.

In accordance with one particular illustrative embodiment of the present invention, the first frame in a talk spurt is delivered immediately, without bundling. Subsequent frames are then held in abeyance until either a maximum bundle size, m, is exceeded, or until the final frame in the talk spurt is encountered. Illustratively, the maximum bundle size may be 2 (i.e., m=2). When the final frame in the talk spurt arrives, the bundle is sent immediately, without allowing any frames to be (further) held for bundling. That is, when the last frame arrives, any held frames are sent, but the bundle will not continue to grow.

Note that, as one benefit to bundling when used in a mobile (e.g., wireless) communications environment, less power is advantageously required by both the transmitter and receiver. In a mobile receiver, this may yield a measurable improvement in battery life.

Note that, as pointed out above, bundling is currently performed in certain communications systems when the scheduler cannot service all channels adequately. For example, assume that a given scheduler can forward only 20 packets within a 20 millisecond period of time, but that it is receiving packets from 23 different users. In this case, the packets of 3 users cannot be delivered until the next 20 millisecond "round," art which time the scheduler may have 2 packets to transmit for each of those 3 users. In such prior art communications systems, those 3 users' packet pairs will be bundled together for transmission. However, one or more of those particular users' packets may be delay-sensitive in that they may, for example, be a packet at the beginning or end of a talk spurt and thus their delay will have a detrimental effect on conversational delay. Ideally, such users' packets would best be delivered in the first "round."

Thus, in accordance with another illustrative embodiment of the present invention, the scheduler advantageously determines which users have such delay sensitive packets, based on each packet's location in the corresponding user's talk spurt, and then advantageously uses that information by choosing users' packets which are not delay sensitive to wait to be bundled in the next round.

FIG. 1 shows a flowchart of a method for performing packet bundling based on packet location in a talk spurt in accordance with one illustrative embodiment of the present invention. In this illustrative embodiment of the present invention, the first and last frames of a talk spurt are not bundled with any subsequent frames, while all other frames in the talk spurt are bundled together up to a predetermined maximum bundle size. As shown in the figure, the current bundle is initially cleared in block 11, and then, the next packet to be transmitted is added to the current bundle in block 12.

Next, decision block 14 determines whether the given packet is the first packet of a talk spurt. As explained above, this determination may, for example, be made with use of the techniques described in detail in U.S. patent application Ser. No. 11/062,966 and in U.S. patent application Ser. No. 11/078,012 (each of which has been incorporated by reference herein). If it is determined by decision block 14 that the given packet is the first one in a talk spurt, flow continues to block 13, which sends (i.e., transmits) the current bundle (which, in this case, comprises only this first packet alone), and then returns flow to block 11 to begin assembling a new bundle. If, on the other hand, decision block 14 determines that the packet is not the first one in the talk spurt, decision block 15 then determines whether the maximum bundle size has been exceeded—that is, it determines whether the current bundle size exceeds the predetermined parameter value, m.

If decision block 15 determines that the maximum bundle size has been exceeded (i.e., that the current bundle size exceeds the predetermined parameter value, m), then flow continues to block 13, which sends (i.e., transmits) the current bundle and then returns flow to block 11 to begin assembling a new bundle. If, on the other hand, decision block 15 determines that the maximum bundle size has not been exceeded (i.e., that the current bundle size does not exceed the predetermined parameter value, m), then decision block 16 determines whether the given packet is the last packet of a talk spurt. Again, as explained above, this determination may, for example, be made with use of the techniques described in detail in U.S. patent application Ser. No. 11/062,966 and in U.S. patent application Ser. No. 11/078,012 (each of which has been incorporated by reference herein). If it is determined by decision block 16 that the packet is the last one in a talk spurt, flow continues to block 13, which sends (i.e., transmits) the current bundle (which may, in this case, comprise other, previous packets).

If, on the other hand, decision block 16 determines that the given packet is not the last packet in a talk spurt (already knowing from decision block 14 that it is also not the first packet in a talk spurt), flow returns to block 12, which adds the next packet to the bundle. Flow then continues with decision block 14 to process this next packet.

The method of FIG. 1 may, in accordance with various illustrative embodiments of the present invention, be substantially represented in a computer readable medium and may be executed wholly or in part by an otherwise conventional computer or a processor, which may, for example, comprise either special purpose or general purpose hardware. In one illustrative embodiment processor is adapted to count a number of voice frames which have been bundled together, and transmitter is adapted to transmit bundled voice frames together across communications network as a single packet when said number of voice frames which have been bundled together exceeds a predetermined threshold.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future— i.e., any elements developed that perform the same function, regardless of structure.

We claim:

1. A method for performing packet bundling of voice frames comprised in a sequence of voice frames to be transmitted across a Voice-over IP communications network, the method performed by an apparatus comprising a processor and a transmitter, the sequence of voice frames comprising one or more talk spurts, the method comprising the steps of:

determining, with use of the processor, a location of one or more of said voice frames within one of said talk spurts;
   classifying, with use of the processor, each of said one or more of said voice frames as one of either a critical frame or a non-critical frame based on the determined location within said one of said talk spurts thereof;
   bundling, with use of the processor, one of said classified voice frames together with at least one subsequent voice frame thereto in said sequence of voice frames when said one of said classified voice frames has been classified as a non-critical frame;
   counting, with use of the processor, a number of voice frames which have been bundled together; and
   transmitting, with use of the transmitter, said bundled voice frames together across said communications network as a single packet when said voice frames which have been bundled together comprise the number of voice frames which exceeds a predetermined threshold.

2. The method of claim 1 wherein at least one of said voice frames is classified as a critical frame when it is determined to be a first frame in said one of said talk spurts.

3. The method of claim 1 wherein at least one of said voice frames is classified as a critical frame when it is determined to be a last frame in said one of said talk spurts.

4. The method of claim 1 wherein at least one of said voice frames is classified as a critical frame when it is determined to be one of either a first frame or a last frame in said one of said talk spurts and wherein at least one of said voice frames is classified as a non-critical frame when it is determined to be neither a first frame of any one of said talk spurts nor a last frame of any one of said talk spurts.

5. The method of claim 1 wherein the Voice-over IP communications network comprises a wireless communications network.

6. A method for performing packet bundling of voice frames comprised in a sequence of voice frames to be transmitted across a Voice-over IP communications network, the method performed by an apparatus comprising a processor and a transmitter, the sequence of voice frames comprising one or more talk spurts, the method comprising the steps of:

determining, with use of the processor, a location of one or more of said voice frames within one of said talk spurts based on a coding rate of an encoded version thereof;
   classifying, with use of the processor, each of said one or more of said voice frames as one of either a critical frame or a non-critical frame based on the determined location within said one of said talk spurts thereof;
   bundling, with use of the processor, one of said classified voice frames together with at least one subsequent voice frame thereto in said sequence of voice frames when said one of said classified voice frames has been classified as a non-critical frame; and
   transmitting, with use of the transmitter, said bundled voice frames together across said communications network as a single packet.

7. The method of claim 6 wherein at least one of said voice frames is classified as a critical frame when it is determined to be a first frame in said one of said talk spurts.

8. The method of claim 6 wherein at least one of said voice frames is classified as a critical frame when it is determined to be a last frame in said one of said talk spurts.

9. The method of claim 6 wherein at least one of said voice frames is classified as a critical frame when it is determined to be one of either a first frame or a last frame in said one of said talk spurts and wherein at least one of said voice frames is classified as a non-critical frame when it is determined to be neither a first frame of any one of said talk spurts nor a last frame of any one of said talk spurts.

10. The method of claim 7 wherein the Voice-over IP communications network comprises a wireless communications network.

11. An apparatus for performing packet bundling of voice frames comprised in a sequence of voice frames to be transmitted across a Voice-over IP communications network, the sequence of voice frames comprising one or more talk spurts, the apparatus comprising:

a processor adapted to (i) determine a location of one or more of said voice frames within one of said talk spurts, (ii) classify each of said one or more of said voice frames as one of either a critical frame or a non-critical frame based on the determined location within said one of said talk spurts thereof, (iii) bundle one of said classified voice frames together with at least one subsequent voice frame thereto in said sequence of voice frames when said one of said classified voice frames has been classified as a non-critical frame, and (iv) counting a number of voice frames which have been bundled together; and a transmitter adapted to transmit said bundled voice frames together across said communications network as a single packet when said voice frames which have been bundled together comprises the number of voice frames which exceeds a predetermined threshold.

12. The apparatus of claim 11 wherein at least one of said voice frames is classified as a critical frame when it is determined to be a first frame in said one of said talk spurts.

13. The apparatus of claim 11 wherein at least one of said voice frames is classified as a critical frame when it is determined to be a last frame in said one of said talk spurts.

14. The apparatus of claim 11 wherein at least one of said voice frames is classified as a critical frame when it is determined to be one of either a first frame or a last frame in said one of said talk spurts and wherein at least one of said voice frames is classified as a non-critical frame when it is determined to be neither a first frame of any one of said talk spurts nor a last frame of any one of said talk spurts.

15. The apparatus of claim 11 wherein the Voice-over IP communications network comprises a wireless communications network.

16. An apparatus for performing packet bundling of voice frames comprised in a sequence of voice frames to be transmitted across a Voice-over IP communications network, the sequence of voice frames comprising one or more talk spurts, the apparatus comprising:

a processor adapted to (i) determine a location of one or more of said voice frames within one of said talk spurts based on a coding rate of an encoded version thereof, (ii) classify each of said one or more of said voice frames as one of either a critical frame or a non-critical frame based on the determined location within said one of said talk spurts thereof, and (iii) bundle one of said classified voice frames together with at least one subsequent voice frame thereto in said sequence of voice frames when said one of said classified voice frames has been classified as a non-critical frame; and a transmitter adapted to transmit said bundled voice frames together across said communications network as a single packet.

17. The apparatus of claim 16 wherein at least one of said voice frames is classified as a critical frame when it is determined to be a first frame in said one of said talk spurts.

18. The apparatus of claim 16 wherein at least one of said voice frames is classified as a critical frame when it is determined to be a last frame in said one of said talk spurts.

19. The apparatus of claim 16 wherein at least one of said voice frames is classified as a critical frame when it is determined to be one of either a first frame or a last frame in said one of said talk spurts and wherein at least one of said voice frames is classified as a non-critical frame when it is determined to be neither a first frame of any one of said talk spurts nor a last frame of any one of said talk spurts.

20. The apparatus of claim 16 wherein the Voice-over IP communications network comprises a wireless communications network.

* * * * *

UNITED STATES PATENT AND TRADEMARK OFFICE
CERTIFICATE OF CORRECTION

PATENT NO. : 7,633,947 B2  Page 1 of 1
APPLICATION NO. : 11/288743
DATED : December 15, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1051 days.

Signed and Sealed this

Twenty-first Day of December, 2010

David J. Kappos
*Director of the United States Patent and Trademark Office*